Patented Feb. 12, 1929.

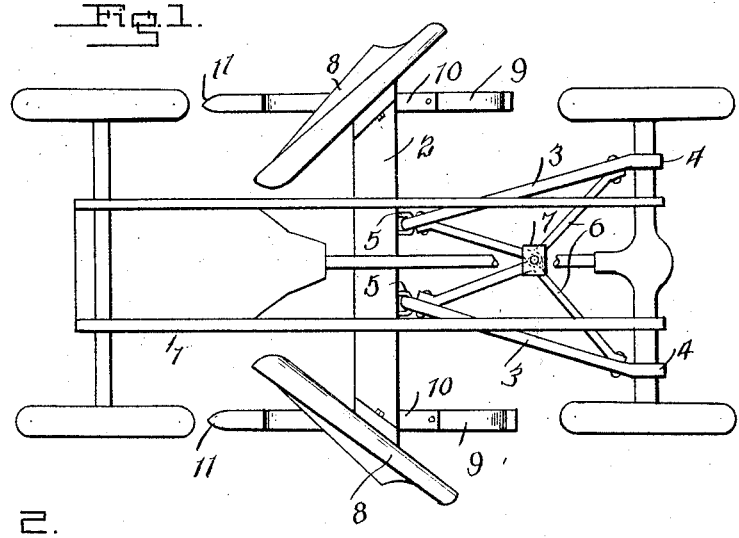
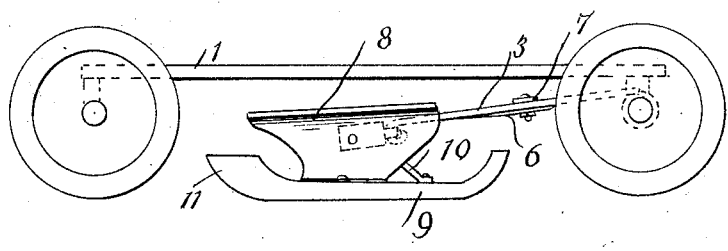
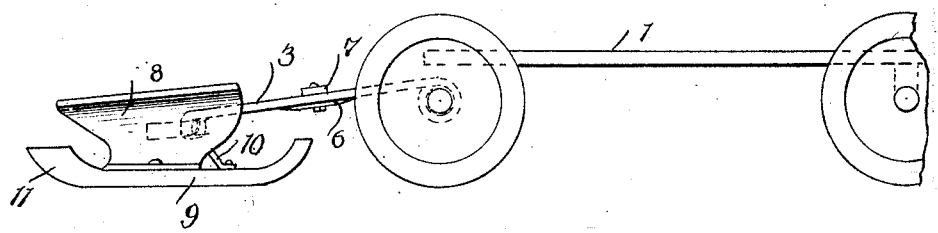

1,701,708

UNITED STATES PATENT OFFICE.

JOSEPH D. GLAICAR AND ADAM E. ZIEGLER, OF ARMSTRONG, BRITISH COLUMBIA, CANADA.

SNOWPLOW.

Application filed September 23, 1927, Serial No. 221,522, and in Canada March 9, 1927.

This invention has for its object the provision of a simple, strong and durable mechanism which may be readily applied to a motor vehicle for clearing a road of snow and breaking a path through a snow-covered road. The invention is illustrated in the accompanying drawing and consists in certain novel features which will be hereinafter first fully described and then more particularly defined in the appended claim.

In the drawing:

Figure 1 is a plan view of our improved snow plow showing the same attached to the rear axle of a motor vehicle;

Fig. 2 is a side elevation of the plow arranged as shown in Fig. 1, and

Fig. 3 is a similar view showing the same applied to the front axle of a motor vehicle and arranged to break through the snow covering a road.

The motor vehicle may be of any known or approved type and is illustrated at 1 in a more or less diagrammatic manner. In carrying out the present invention, we provide a cross beam 2 which may be of any approved material and of such dimensions as will furnish the desired strength and durability. To the back edge of this cross beam, we attach the front ends of push bars 3 which have their rear ends constructed with eyes 4 whereby they may be clamped to an axle of a motor vehicle, the front ends of these push bars being formed into hooks or like elements engageable through eyes 5 on the cross beam whereby a hinge connection between the beam and the push bars will be provided so that the beam and bars may have relative pivotal movement to accommodate the vibration imparted to the vehicle in traveling over a rough road. The push bars converge forwardly, as shown clearly in Fig. 1, this arrangement more effectually applying the propelling force to the cross beam and the plows carried thereby, and between the push bars braces 6 are arranged, the said braces being rigidly secured at their ends to the push bars adjacent the ends of the same and a coupling bracket 7 being provided at the center of the braces to effectually and rigidly secure them together. At the ends of the cross beam 2, we secure shares 8 which are disposed obliquely relative to the beam and the line of travel so that they converge forwardly, as shown clearly in Fig. 1, and are concave on their front faces in a vertical direction whereby the snow will be rolled over and turned aside to be easily deflected from the path of the vehicle and deposited at the side of the road. It will be noted that the outer ends of the shares project laterally beyond the sides of the vehicle or running gear so that a wide path will be broken and the snow which is taken up and turned aside will be deposited at the sides of the path. We also provide runners 9 which are connected to the ends of the beam by brackets 10 and also have one edge of the share secured thereto, the front end of each runner forming a sharp-edged nose 11 to cut through the snow.

When the plow is to be used for breaking through a covered road and clearing away drifts, it is attached to the front axle of the vehicle, as shown in Fig. 3. The shares are so shaped that they tend to cut under the snow and, consequently, as the vehicle travels forwardly, the shares will cut into the snow drifts and turn the same aside to form well defined paths in which the wheels of the vehicle may travel. After a road has been broken and it is desired to clear away side drifts, the plow is arranged, as shown in Figs. 1 and 2, with the runners disposed upon the ground between the front and rear wheels of the vehicle. The form of the shares effects a lifting and turning aside of the snow and the distance to which the snow may be moved depends on the speed at which the vehicle may travel. At speeds of five miles and less per hour the snow is pushed aside but at greater speeds it is thrown from three to twenty feet.

It will be noted that we have provided an exceedingly simple structure which may be readily applied to any motor vehicle and operated by the travel of the vehicle to break through snow drifts and efficiently clear away paths for vehicular travel.

Having thus described the invention, we claim:

An apparatus for the purpose set forth comprising a cross beam, runners attached to the ends of the beam, obliquely disposed plow shares attached to the runners and to the ends of the beam, and a frame attached to the beam and extending rearwardly therefrom and constructed to be attached to a vehicle axle.

In testimony whereof we affix our signatures.

JOSEPH D. GLAICAR. [L. S.]
ADAM E. ZIEGLER. [L. S.]